United States Patent [19]
Aarons et al.

[11] 3,814,411
[45] June 4, 1974

[54] CUSHION HITCH
[75] Inventors: Geoffrey L. Aarons, Lake Forest; Ralph M. De Weese, Antioch, both of Ill.
[73] Assignee: International Harvester Company, Chicago, Ill.
[22] Filed: May 10, 1972
[21] Appl. No.: 251,867

[52] U.S. Cl. .............................. 267/63 R, 267/152
[51] Int. Cl. ............................................... F16k 1/40
[58] Field of Search ...... 267/63 RV, 63 AV, 151 V, 267/153 V, 140 V, 141 V

[56] References Cited
UNITED STATES PATENTS
| | | | |
|---|---|---|---|
| 3,086,765 | 4/1963 | Zanaw | 263/63 R |
| 3,677,535 | 7/1972 | Beck | 267/153 |
| 3,480,268 | 11/1969 | Fishbaugh | 267/63 |

Primary Examiner—James B. Marbert
Attorney, Agent, or Firm—Ronald C. Kamp; Floyd B. Harman

[57] ABSTRACT

A cushion hitch for a vehicle capable of cushioning both push and pull loads having a housing affixed to the vehicle with a central guide tube and a pair of chamber tubes on either side thereof. A spring assembly is positioned in each of the chamber tubes and includes front and rear plates separated by a plurality of elastomer toroids with interleaved metal washers with stops to prevent the plates from exiting from the respective tubes. A hitch adapter is provided with means for pushing the front plates toward the rear plates under push loads imposed on the adapter and means for pulling the rear plates toward the front plates under pull loads. Various spring rates and maximum operating loads can be varied by varying the size and number of toroids with spacer rings being utilized to maintain the smaller toroids with larger central openings centered and aligned within the chamber tubes.

5 Claims, 4 Drawing Figures

CUSHION HITCH

BACKGROUND AND SUMMARY OF THE INVENTION

Cushion hitches for certain types of vehicles, such as the type which maneuver aircraft on the ground, are necessary to minimize the shock loads which can be imposed on the aircraft components, particularly the landing gear, by such high powered vehicles during acceleration and deceleration. Such hitches should be capable of withstanding the maximum operating load which the vehicle usually imposes without failure and must be capable of cushioning either a compression or tension load. Such hitches should also be capable of such cushioning without an excessive amount of travel or deflection and with a minimum of rebound. Since the size of the vehicle, i.e., weight and power, varies widely, it has been necessary in the past to provide a different hitch designed for each vehicle.

It is an object of the present invention to provide a cushion hitch having all of the desired attributes described above.

It is also an object of this invention to provide a cushion hitch which will permit the maximum utilization of common parts for a wide variety of hitches with different spring rates and capable of operating at different maximum loads.

It is another object of this invention to provide a cushion hitch with the above attributes which will operate with a minimum of maintenance.

These and other objects, and many of the attendant advantages thereof, will become more readily apparent from a perusal of the following description and the accompanying drawings, wherein.

DESCRIPTION OF PREFERRED EMBODIMENTS

Figure 1:
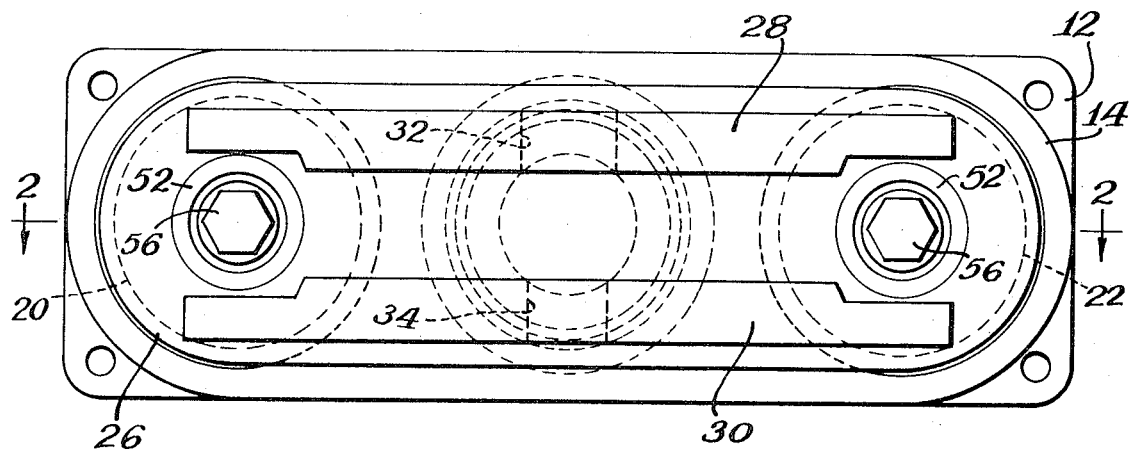
FIG. 1 is a front elevational view of a cushion hitch according to the present invention.
Figure 2:
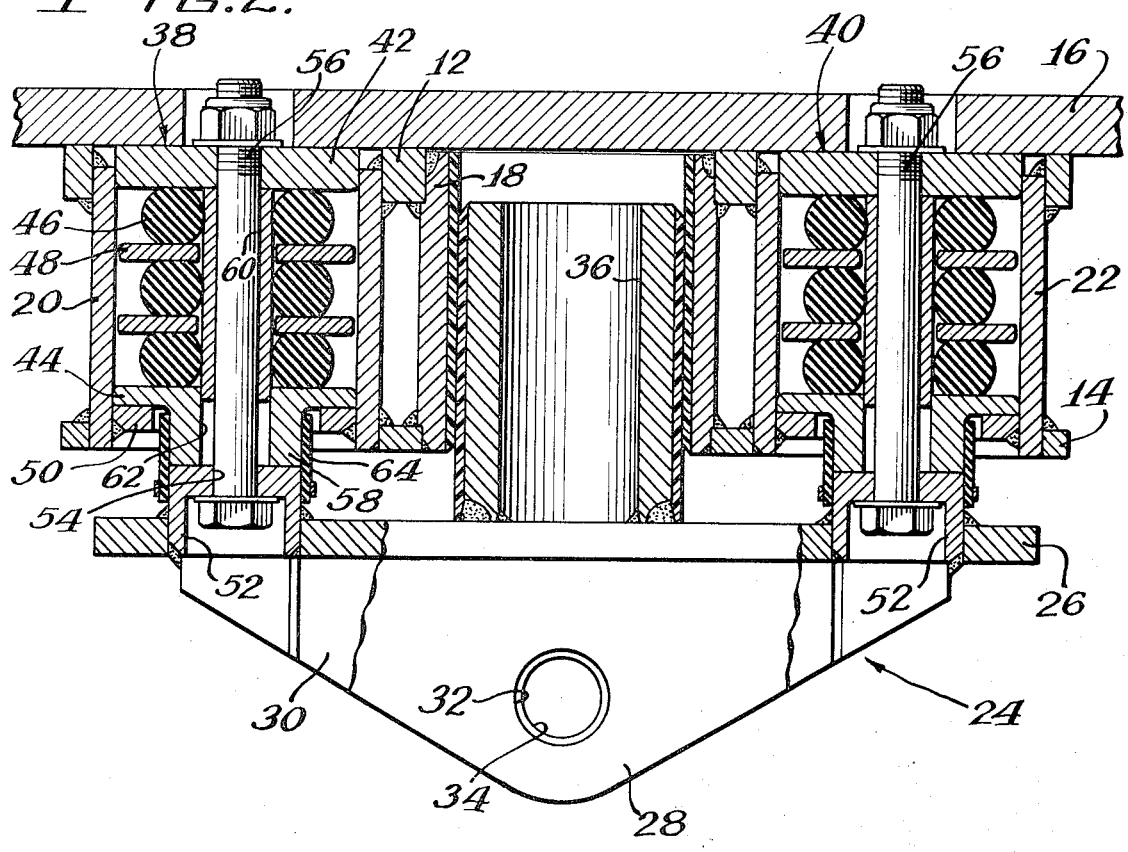
FIG. 2 is a cross-sectional view taken on line 2—2 of FIG. 1.
Figure 3:
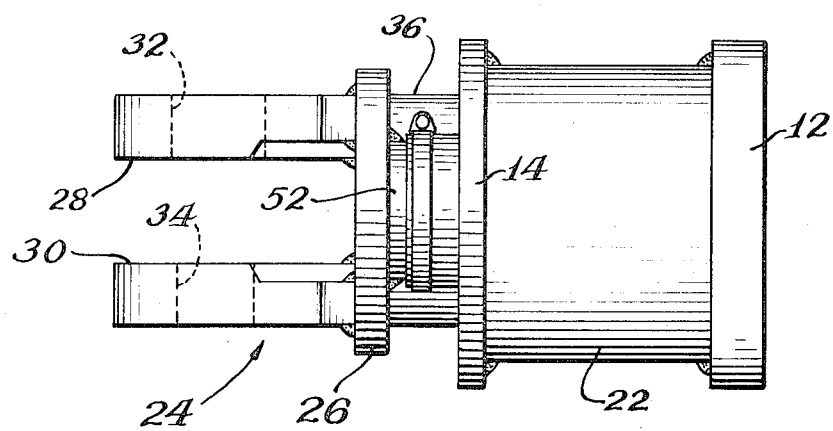
FIG. 3 is a side elevational view of the hitch shown in FIG. 1.

Referring now to the hitch shown in FIGS. 1-3, the hitch is provided with a housing which includes a base plate 12 and a front plate 14. The base plate 12 is attached to a wall, represented at 16, of the vehicle, which wall serves as a stop member as explained hereinafter. A central guide tube 18 is secured between aligned openings provided on the plates. A pair of tubes 20 and 22 are also affixed to the plates 12 and 14 in alignment with openings provided on the plates.

A hitch adapter 24 comprises a base member 26 to which a pair of horizontal spaced plates 28 and 30 are secured. The plates 28 and 30 are provided with aligned bores 32 and 34 respectively. The tow bar or implement can be attached to the adapter 34 by inserting the eye thereof between the plates 28 and 30 and dropping a pin through the bores 32 and 34 and the eye. A central guide pin 36 is secured to the base member 26 and is accepted by and reciprocable in the guide tube 18. The guide pin and tube have a close fit and serve to prevent cocking of the adapter 24 relative to the housing. In order to minimize friction, the mating surfaces of the tube 18 and pin 36 may be coated with a material having a low coefficient of friction such as polytetrafluoroethylene.

Each of the tubes 20 and 22 forms a chamber containing a spring and shock-absorber unit 38 and 40 respectively. Since the unit or assembly on each chamber is identical only the unit 38 will be described. A circular rear plate or washer 42 mates with and is reciprocable within the chamber tube 20. A circular front plate or washer 44 mates with and is reciprocable with the tube 20. These plates are separated by a plurality of toroids 46. Metal washers 48 are interleaved between the toroids 46. These toroids must be capable of deflecting under compression to cushion the load imposed on the adapter 24 and must not rebound. That is, the toroids must function as both a spring and a shock absorber. A suitable material having the desired characteristics from which the toroids 46 can be made is adiprene, and may be of the type disclosed in U.S. Pat. No. 3,515,382 issued June 2, 1970 to Richard J. Gallagher.

The plates 42 and 44 are prevented from exiting from the tubes by stop members, the front plate 44 by a ring 50 secured to the front end of the tube 20 and the rear plate 42 by contact with the adjacent wall 16, although separate stop means similar to the ring 50 may be secured to the rear end of the tube 20 if desired.

The toroids 46 are placed under a compression load regardless of whether the adapter 24 is pushing or pulling by means of a collar 52 secured to the base member 26. The collar has an opening 54 through which a bolt 56 slidably passes, the head thereof being larger than the opening 54. The bolt 56 also passes through the rear plate 42. It can be seen therefore that a pulling force on the adapter 24, and hence on the collar 52 will cause the bolt 56 to move the rear plate 42 inward toward the front plate 44 which is retained by the ring 50. The toroids 46 will therefore be compressed. A shoulder 58 is formed on the front plate 44 and normally contacts the collar 52. Hence, a pushing force on the adapter 24 will cause the front plate 44 to move inward toward the rear plate 46 which is retained by the wall 16 causing the toroids 46 to be compressed.

A sleeve 60 is secured to the rear plate 42 and is slidably received by the central bore 62 on the front plate 44. The sleeve 60 serves to maintain the toroids 46 centered with the bolt 56 and aligned with each other and by piloting on the bore 62 assists alignment and minimizes binding. The free operation of the unit 38 is assisted also by packing the chamber with grease. A sleeve or hose section 64 is clamped to the collar 52 and prevents dirt and contaminants from entering.

Figure 4:
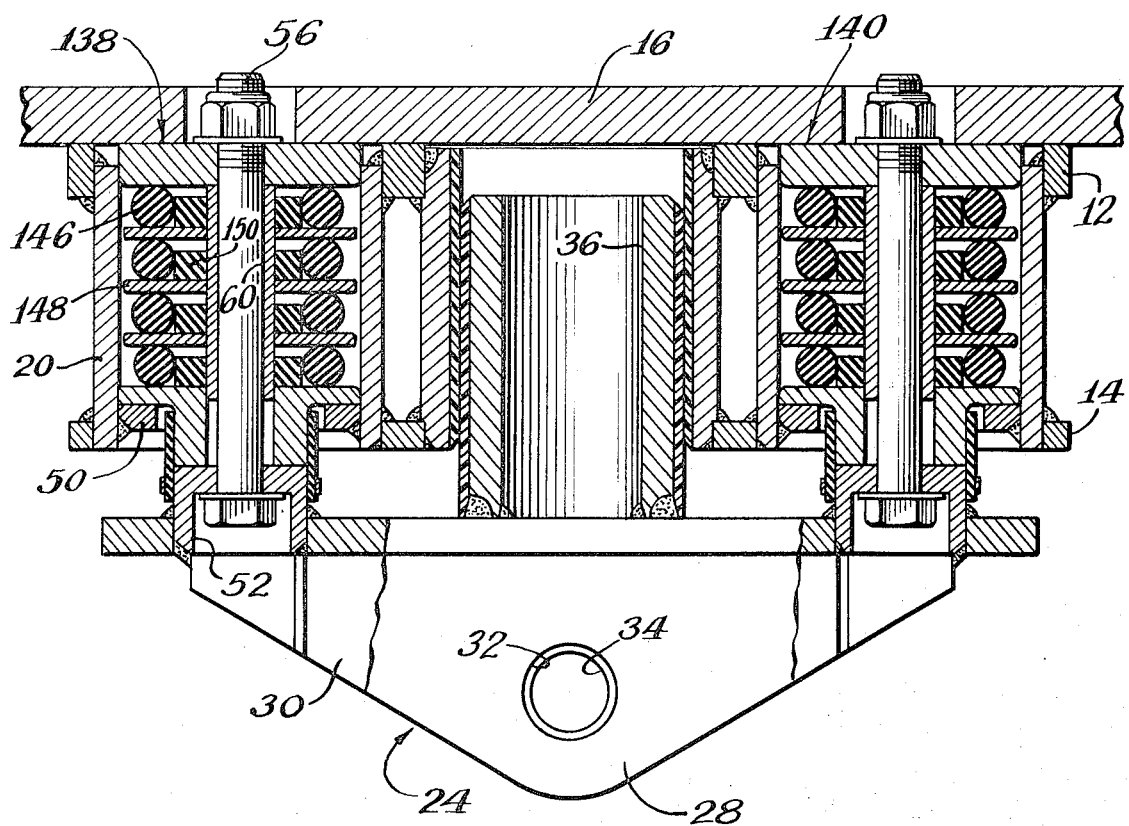
FIG. 4 is a cross-sectional view, similar to FIG. 2, of the hitch shown in FIG. 1 as modified to provide different maximum operating load and spring rate.

Referring now to the hitch in FIG. 4, the basic structure is identical to that described in connection with FIGS. 1-3, and the same reference character has been used to identify the same component. The spring units 138 and 140 are identical to each other, although different from that previously described. In this embodiment, a lower maximum operating load is to be encountered. The toroids 146 are therefore smaller in cross-sectional diameter and have a larger central diameter or opening. A greater number of toroids 146 are utilized to obtain the strength and spring rate desired and the thickness of the metal washers 148 has been varied to compensate for the section diameter change so that the spring unit 138 fills the chamber, with only a slight preload, as is desired in both embodiments. Since the central diameter or opening of the toroids 148 is too large to permit centering and alignment, a spacer ring 150 is positioned between the toroids 146 and the sleeve 60. The interleaved washers 148 also extend under both the toroids 146 and the rings 150 to insure the spacer ring will properly perform its function. The spacer rings are preferably made of the same material as the toroids and are of smaller height than the toroids.

Having described the preferred forms of this invention, it is to be understood that various changes and modifications may be made without departing from the spirit of the invention as defined by the scope of the appended claims.

What is claimed is:

1. In a push-pull shock-absorbing unit designed for a given spring rate, said unit having a fixed tube,
   a pair of end plates slidable in the tube,
   stop means for permitting each end plate to move into the tube toward the opposite end while preventing each end plate from exiting from the adjacent end,
   a compression member for pushing one of said plates toward the other plate, and
   a tension member extending from said other plate through said one plate and said compression member,
   said unit design to accept a spring assembly including a plurality of first elastomer toroids having a given section diameter and a given opening approximately the same as the diameter of said tension member with a plurality of first metal washers separating said first toroids; the improvement comprising:
   a substitute spring assembly to replace said design spring assembly, said substitute spring assembly including:
   a plurality of second elastomer toroids having a smaller section diameter than said given diameter and a larger opening than said given opening;
   a spacer ring positioned within said larger opening and between each of said second toroids and the tension member; and
   a plurality of second metal washers separating said second toroids.

2. In a unit according to claim 1 wherein said toroids are formed of adiprene.

3. In a unit according to claim 2, wherein said tube is filled with a lubricant.

4. In a unit according to claim 2 wherein said spacer rings have a rectangular cross section.

5. In a unit according to claim 4 wherein said spacer rings are formed of adiprene.

* * * * *